United States Patent
Wiggins et al.

(10) Patent No.: US 7,058,662 B2
(45) Date of Patent: Jun. 6, 2006

(54) MAINTENANCE OF DATA INTEGRITY DURING TRANSFER AMONG COMPUTER NETWORKS

(75) Inventors: Kevin Wiggins, Redwood City, CA (US); Barry Lind, Union City, CA (US)

(73) Assignee: Xythos Software, Inc., San Francisco, CA (US)

( * ) Notice: Subject to any disclaimer, the term of this patent is extended or adjusted under 35 U.S.C. 154(b) by 326 days.

(21) Appl. No.: 09/728,784

(22) Filed: Nov. 30, 2000

(65) Prior Publication Data

US 2002/0065834 A1 May 30, 2002

(51) Int. Cl.
*G06F 17/30* (2006.01)

(52) U.S. Cl. .............. 707/200; 707/202; 707/204; 709/101

(58) Field of Classification Search ............... 707/100, 707/204, 4, 202, 9, 10, 200, 201, 104.1, 103.1, 707/102, 206; 709/101, 207, 228; 711/156; 370/236

See application file for complete search history.

(56) References Cited

U.S. PATENT DOCUMENTS

| | | | | |
|---|---|---|---|---|
| 5,835,764 A * | 11/1998 | Platt et al. | ............ | 709/101 |
| 6,061,708 A * | 5/2000 | McKeehan et al. | ......... | 709/101 |
| 6,067,542 A * | 5/2000 | Carino, Jr. | .................. | 707/4 |
| 6,081,812 A * | 6/2000 | Boggs et al. | ............. | 707/202 |
| 6,199,068 B1* | 3/2001 | Carpenter | .................. | 707/100 |
| 6,260,040 B1* | 7/2001 | Kauffman et al. | ............ | 707/10 |
| 6,304,882 B1* | 10/2001 | Strellis et al. | ............ | 707/202 |
| 6,453,325 B1* | 9/2002 | Cabrera et al. | ............ | 707/204 |
| 6,502,139 B1* | 12/2002 | Birk et al. | .................. | 709/233 |
| 6,529,478 B1* | 3/2003 | Schwartz et al. | ........... | 370/236 |
| 6,732,124 B1* | 5/2004 | Koseki et al. | ............. | 707/202 |

* cited by examiner

*Primary Examiner*—Jeffrey Gaffin
*Assistant Examiner*—Hassan Mahmoudi
(74) *Attorney, Agent, or Firm*—Carr & Ferrell LLP

(57) ABSTRACT

A method of transferring data between a first system and a second system while ensuring the integrity. Metadata is associated with each data record and is used to ensure the integrity of the transfer.

17 Claims, 4 Drawing Sheets

MAINTENANCE OF DATA INTEGRITY DURING TRANSFER AMONG COMPUTER NETWORKS

BACKGROUND OF THE INVENTION (1) Field of the Invention

The present invention relates generally to the transfer of data between computing systems and more specifically to maintaining the integrity of those transfers.

(2) Background Art

The transfer of data between different computing systems may be critical in the correct operation of those systems. For example, an electronic funds transfer from a checking to a savings account requires two data transfer steps. The first step is the reduction of the balance in the checking account and the second step is to pass the amount to the savings account for addition. If the computer system fails, and the transaction is interrupted between steps, then the funds would be lost.

Potential failures include "dirty reads" and "dirty writes". Dirty reads occur when read and write operations occur simultaneously on the same data. If a write operation is executed during a read operation, the data read can incorrectly be a mixture of the data that existed before and after the write. Dirty writes occur when a write operation is not completed, potentially leaving data with an incorrect mixture of new and old values.

"ACID" protocols can be used to ensure the integrity of transactions and to avoid any potential failures. ACID is an acronym that stands for Atomicity, Consistency, Isolation, and Durability. Atomicity is achieved by ensuring that multi-step processes are executed as a single element. In other words, no single step is committed until all steps are completed. If a failure does occur, durability is achieved by including failure tracking and the ability to rollback the system to a previous state. Isolation is achieved by requiring that read and write operations are complete before their effect can be seen by the rest of the system. Consistency implies that operations on data generate consistent and reproducible results.

The ACID protocols can be implemented to varying degrees. Adherence to the strictest protocols creates a significant overhead and can appreciably slow transactions. Systems that require rapid data transfer rates, therefore, cannot take full advantage of ACID protocols. However, less than the full set of ACID protocols can still ensure the integrity of certain types of transactions.

"Data systems" are software programs designed to process and store digital data. All data systems discussed in this document are considered to ensure the integrity of data, such as by using ACID protocols. Data systems include relational database systems that are available from companies such as Oracle, IBM, Microsoft, and Informix.

In addition to atomicity, consistency, isolation, and durability, the advantages of commercially available data systems can include logging, versioning, access control, and simple metadata manipulation. Disadvantages, however, include reduced transaction speeds, cumbersome access interfaces (ODBC and SQL Queries), and a lack of important text handling utilities in most commercial systems.

In contrast, "File Systems," such as those associated with UNIX®, Windows NT®, OS/2® and Linux®, usually do not follow stringent ACID protocols. For example, although files may be locked to prevent simultaneous reads and writes (isolation), there is normally no method for preventing dirty writes (durability), a problem that is exacerbated by the lack of a rollback recovery system. Additionally, many file systems first store data into volatile memory before writing to long term storage. Data, therefore, is subject to the stability of the volatile memory. File systems also lack simple means for associating metadata with files and for logging operations.

File systems are specifically designed for file management and include storage structures appropriate for standard storage devices. Since they are typically integrated into a computer's operating system they can have direct control of device drivers and are, therefore, optimized for rapid data transfer. File handling utilities, such as text search and virus filters, are also readily available. Data can be logically distributed over directories, physical storage devices, or computer systems and is stored in a manner that permits easy access and manipulation by other software. A file system may include a multitude of physical storage locations and devices.

The differences between data systems and file systems are especially significant with communication between computers and external networks. The structure of a network greatly increases the probability that a process will be interrupted, an issue that has grown in importance with the development of large computer networks such as the Internet.

When data are transferred between computing devices they are typically received by either data system or file system software. Developers must choose between the advantages and disadvantages of each.

There is a significant need for a system that overcomes the disadvantages of the prior art.

SUMMARY OF THE INVENTION

The invention provides a method for managing a data system and a file system. The data system is a software program that processes and stores data and is designed to ensure the integrity of the data. Integrity includes file read consistency, prevention of dirty reads and dirty writes, and logging features that allow recovery from entire system failures. However, the cost of such integrity includes difficult management (especially of large data systems), large processor requirements, and the lack of management tools and filters. The file system is a software program that is designed to manage files quickly and with less processing power requirements, yet generally unable to ensure the integrity of data. By coordinating both the data system and the file system, the advantages of both can be used without suffering any significant disadvantages.

The management system ensures that data from an external sources is first received by the data system. In so doing, the integrity of the data in maintained. Once received, the data is copied from the data system to the file system so the advantages of the file system can be exploited. Metadata is used to ensure data integrity is maintained during the copying of data from the data system to the file system and to describe and track the state and location of the data.

DETAILED DESCRIPTION OF THE INVENTION

Figure 1:
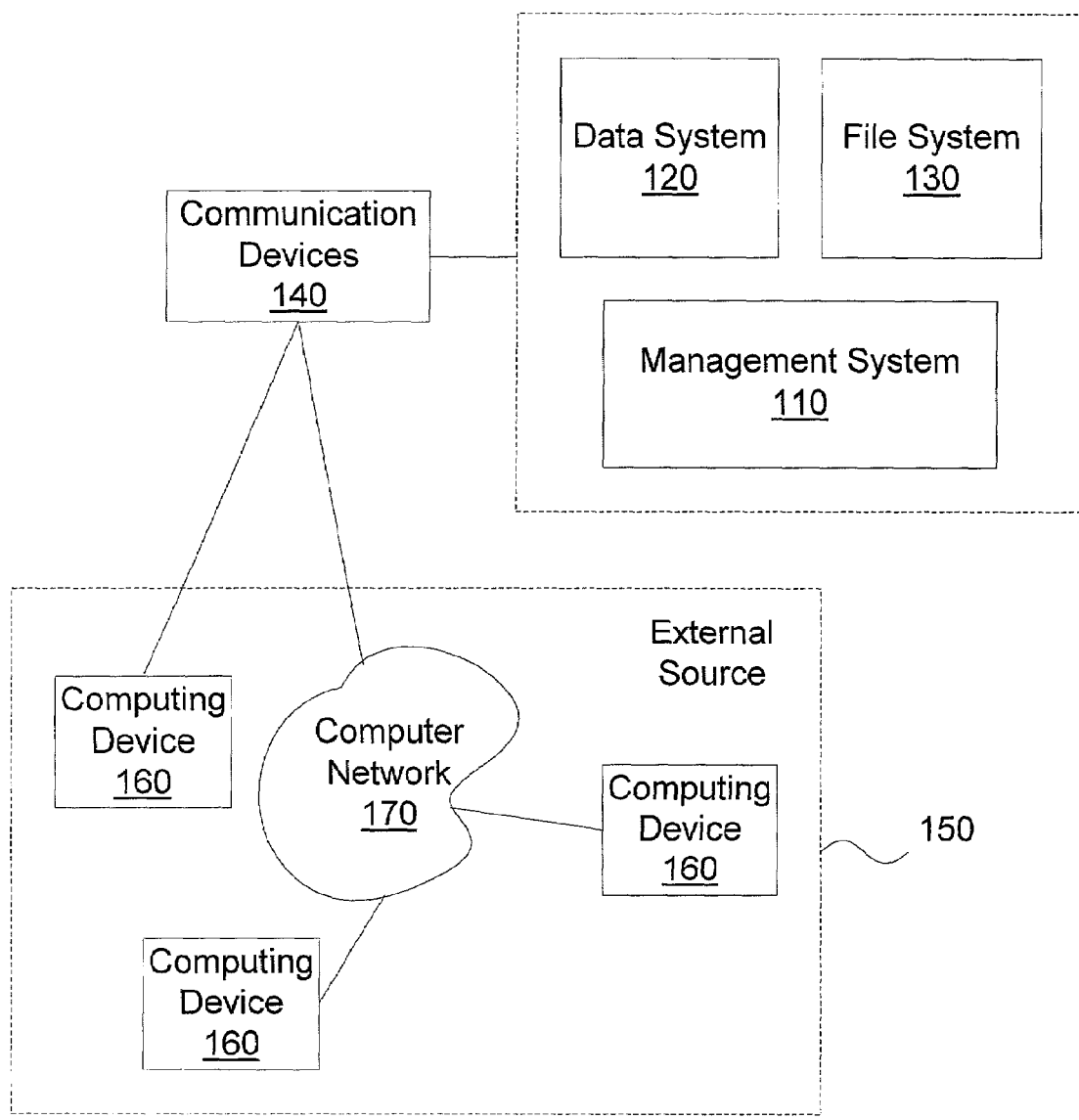
FIG. 1 is a block diagram of the invention and its relationship to other elements of the computing environment.

FIG. 1 shows the relationships between elements of the current invention and a computer network. A management system 110 supervises the functions of a data system 120 and a file system 130. Although the management system 110 can be an intrinsic part of a data system 120, created or modified just for the purpose of the invention, it is preferably overlaid on top of an existing commercial data system 120 as a component or an add-on. The different systems 110, 120 and 130 can receive digital data through a communications device 140 from external sources 150 such as a computing device 160 or a computer network 170.

Figure 2:
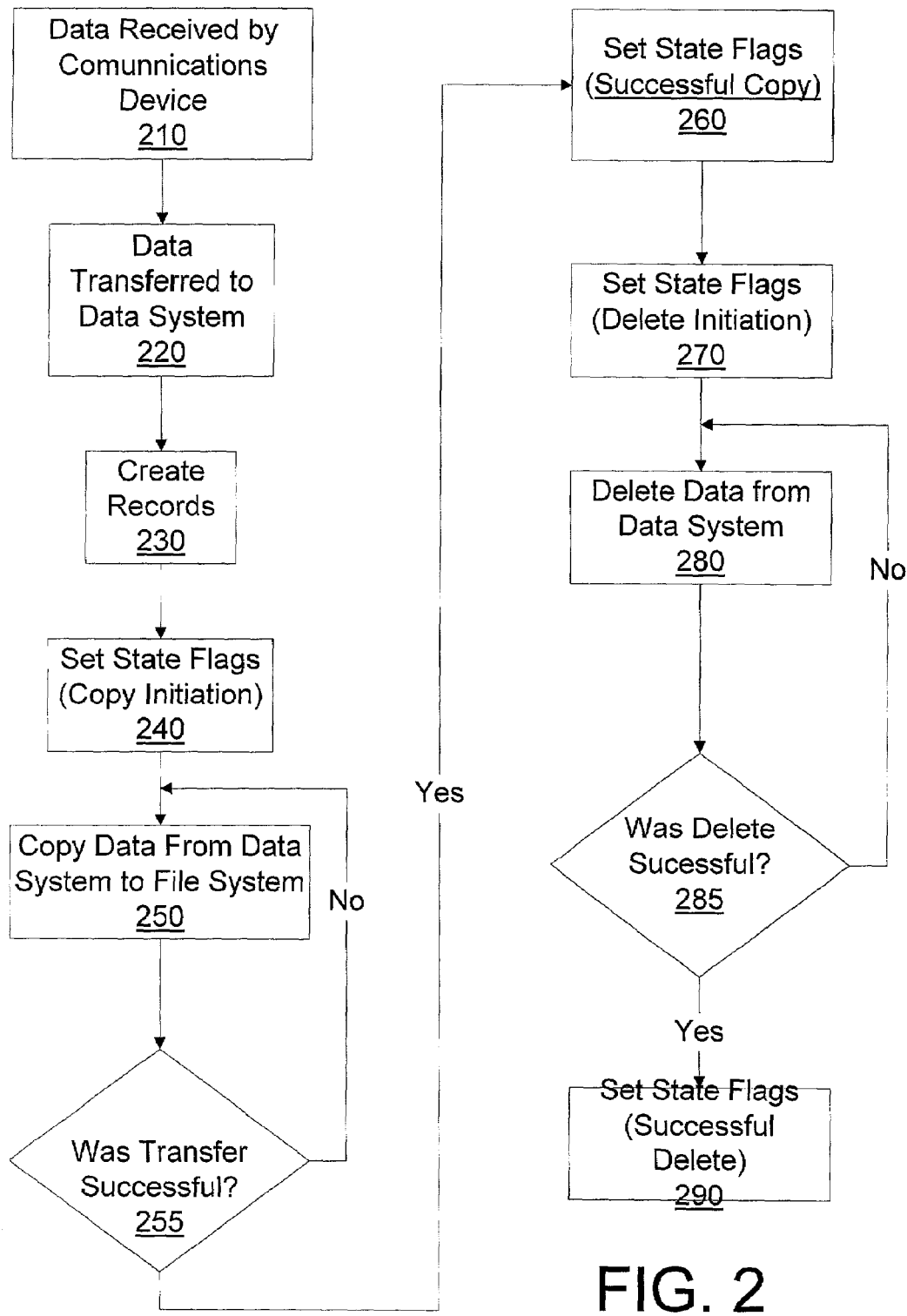
FIG. 2 is a flowchart of a method for transferring data to a computer file system via intermediate storage in a data system.

FIG. 2 illustrates how the invention processes data. In the first step 210 data is received by a communications device 140 from an external source 150. The data is then passed through to the data system 120 in the next step 220. It is essential to the invention that the data be delivered to the data system 120 or equivalent software because the integrity of the data must be ensured. If a problem is encountered in the data transfer, the state of the data system 120 must be able to be rolled back to the condition that existed prior to the initiation of the transfer. A record for the data is created during the step 220 of passing data to the data system 120. The record can include metadata, additional data that describes data or states of data, such as the data's title, creation date, and last modification date. Transferring data from the external source 150 to the data system 120 and creating data records are known in the current art.

It is essential that some metadata, however, be associated with the data. Specifically, the required metadata must include state flags that are used to ensure the integrity of the data and describe and track the state of the data throughout its lifetime. As used in this specification, the term "state flag", whether singular or plural, means any method that can be used to describe the status of the data. State flags can refer to variables, binary switches, tables, organization or location of data, the absence of certain data, by reference to the time or some combination of these methods.

Although it is preferred that the required metadata be maintained in the data system 120, there is no limitation to where the metadata is stored. It is essential, regardless of where the metadata is stored, that the management system 110 be able to access the information within the metadata. The metadata can be used to make the specific workings of the invention transparent to the external sources 150.

Initially, the state flags indicate that the data is found on the data system 120. Depending on the specific implementation of the invention, the state flags may also be used to indicate where other copies are located or that no other copies of the data exist.

In the next step 240 the state flags are set to indicate that the transfer from the data system 120 to the file system 130 has been initiated. This flag is used to ensure that the transfer will meet selected ACID protocols with regard to the reading and writing of data so that no other transaction can cause interference. Considerable overhead reduction can be achieved by meeting only those ACID protocols required for this specific transfer ("minimum ACID protocols").

The next step 250 then attempts to create a second copy of the data on the file system 130. If the copy is not successful the transfer can be retried or an error handling process can be initiated. Otherwise, state flags are set in the following step 260 to indicate that the transfer was successful. The utilities needed to perform the data transfer and confirm its success can be found in standard data systems 120 and file systems 130. The steps 240, 250, and 255 involved in copying the data from the data system 120 to the file system 130 can be performed at any time. Prior to creating a copy of the data on the file system 130, all requests to access the data from external sources must be either denied or directed to the data system 120. The management system 110, therefore, must be able to interpret the state flags and determine whether a copy of the data exists on the file system 130.

Additionally, filters can be used whenever data is transferred to the file system 130. Filters can be used for authentication, decryption and encryption, command or syntax parsing, interpretation, compilation, type/format conversion, access control, security, and the detection of undesirable code such as virus and system commands. If filters are desired, they can be implemented before or during the step 250 of copying the data to the file system 130.

In order to free memory, the data can be deleted from the data system 120. Although these steps 270, 280, 285, and 290 can be performed immediately, after a certain period of time has passed, at an arbitrary time, or after selected events have occurred, such as backups. One may alternatively use metadata associated with the some file systems 130 (e.g., the archive flag found in MSDOS® and Windows®) to ensure that the data has been backed up. Once the archive flag was set, the step 270 could proceed without the need for further delay. Since file systems 130 do not normally satisfy the durability requirement of ACID protocols, a backup must be performed if the data on the data system 120 is deleted. Although the data system 120 can be used to ensure the durability of the file system 130, using a backup procedure and deleting the data from the data system 120 will typically be a better use of resources. Preferably, the deletion from the data system 120 occurs after two regular backup intervals ensure that at least one backup occurred successfully.

Once deletion is scheduled, state flags are set to indicate the initiation of the deletion process. Next, the data is deleted from the data system 120. If there is a need for further tracking or control of processes related to the data, then the relevant metadata that may be stored on the data system 120 will not be deleted with the data.

Either state flags or data system 120 features can be used to ensure the deletion step 280 meets minimum ACID protocols. An error handling routine can be used or another attempt can be made if the deletion is unsuccessful. If state flags are used, the final step 290 sets the state flags to indicate that the deletion process was successful. However, ensuring the deletion process meets minimum ACID protocols are not essential to the invention. If a delete is unsuccessful it will not effect the integrity of the file system 130 copy of the data.

Embodiments of this invention can also include similar methods by which data integrity is further maintained as additional operations are performed on the data. For example, the operations copy, rename, transfer, and wipe (deletion with overwrite) all involve writing to disk—a process that may be interrupted.

Figure 3:
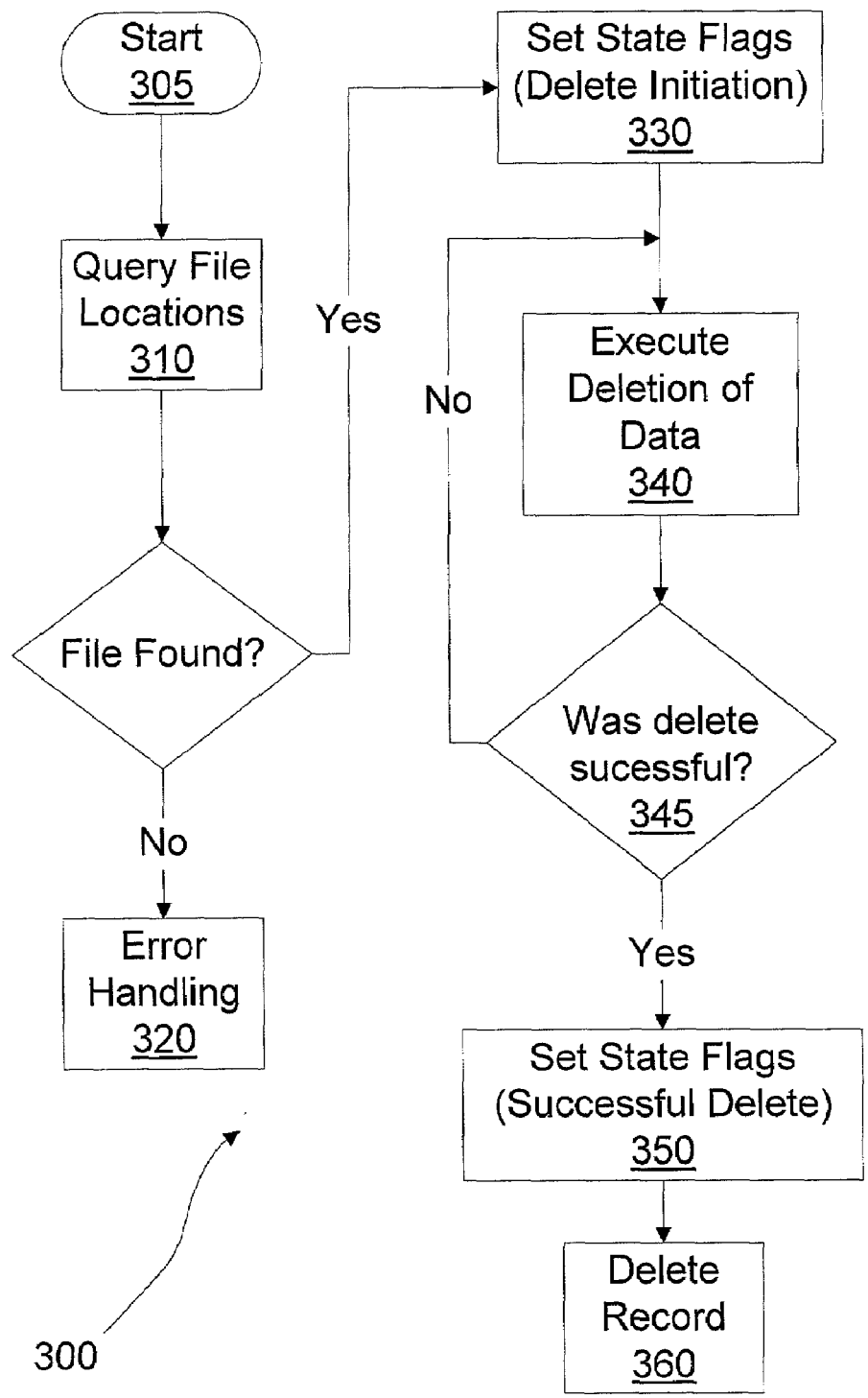
FIG. 3 is a flowchart of a method for deleting files that may be stored on either a file system or a data system or both.

FIG. 3 shows a flow chart 300 illustrating the steps of a delete operation that is performed with minimum ACID protocols. The initial step 305 of the process can be performed immediately on request, after a certain period of time has passed, once a backup has been performed, or after other specified events. Although the invention will typically be transparent to the external sources 150, the invention can be implemented to allow a request to delete only a certain copy of the data.

In the next step 310 the state flags are examined to determine where copies of the data reside. Possibilities of where the data could reside include the file system 130 and the data system 120. If no copies of the file are found the process can be terminated or passed on to an error handler step 320. Otherwise, state flags are set in the next step 330. As mentioned previously, the state flags can be stored anywhere, including the data system. The deletion steps 330, 340, 345, and 350, (representing minimal ACID protocols), can be performed for each data copy to be deleted, either as parallel or serial processes.

If the deletion is unsuccessful, it can be reattempted or an error handling routine can be invoked. Otherwise, state flags are set to indicate that the process is complete. In the final step 360 the entire data system record associated with the data, including metadata, is optionally deleted. This deletion may be delayed or omitted for backup, logging, or other tasks.

Figure 4:
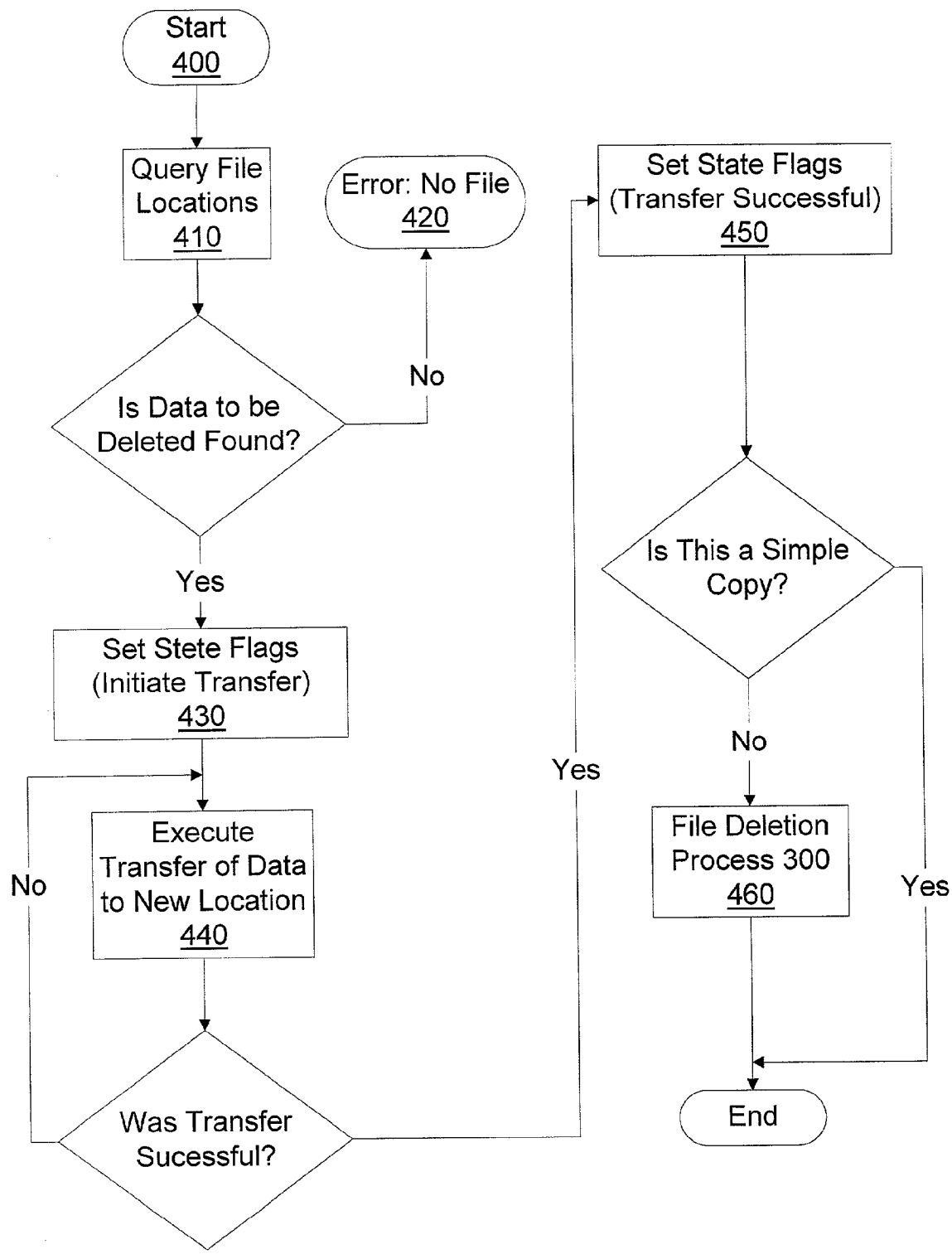
FIG. 4 is a flowchart of a method for copying or transferring files that may be stored on either a file system or a data system or both.

FIG. 4 shows the steps involved in a file copy or file transfer process. A file copy may, for example, be used in file backup operations. The first step 400 of the process can be performed immediately on request, after a certain period of time has passed, once a backup has been performed, or after other specified events. In the next step 410 the state flags are examined to determine where copies of the data reside. Possibilities of where the data could reside include the file system 130 and the data system 120. If copies of the file are not found the process can be terminated or passed on to an error handler step 420. Otherwise, a state flag is set in step 430. In the next step 440 the transfer is attempted. If the transfer is not successful it can be reattempted or the process can be passed to an error handler. If the transfer is successful a flag is set in step 450 to indicate completion. If the process was a file transfer, (copy followed by deletion of the original) a file deletion process (See FIG. 3) is initiated in step 460.

The above description is of illustrative embodiments of the present invention. As these embodiments of the present invention are described with reference to the aforementioned illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

We claim:

1. A method of transferring data that maintains data integrity, the method comprising:
    setting metadata associated with the data to indicate initiation of a transfer of the data;
    transferring the data from a data system to a file system;
    determining whether the transfer of the data was successful;
    setting the metadata to indicate the successful transfer in response to the determination that the transfer of the data was successful;
    setting the metadata to indicate initiation of a deletion of the data;
    deleting the data;
    determining whether the deletion of the data was successful; and
    setting the metadata to indicate the successful deletion in response to the determination that the deletion of the data was successful.

2. The method of claim 1 further comprising transferring the data from the data system to the file system in response to the determination that the transfer of the data was unsuccessful.

3. The method of claim 1 further comprising initiating an error handling process in response to the determination that the transfer of the data was unsuccessful.

4. The method of claim 1 further comprising deleting the data in response to the determination that the deletion of data was successful.

5. The method of claim 1 further comprising initiating an error handling process in response to the determination that the deletion of the data was unsuccessful.

6. The method of claim 1 further comprising:
    receiving the data into the data system from an external source; and
    ensuring the integrity of the data in the data system.

7. The method of claim 1 wherein the metadata comprises a state flag that indicate a state of the data.

8. The method of claim 1 wherein the metadata comprises a state flag that indicate copies of the data.

9. The method of claim 8 further comprising processing the metadata to determine where the copies of the data resides.

10. The method of claim 1 further comprising using filters when transferring the data.

11. A system for transferring data that maintains data integrity, the system comprising:
    a file system;
    a data system configured to transfer the data to the file system and delete the data; and
    a management system configured to set metadata associated with the data to indicate initiation of a transfer of the data, determine whether the transfer of the data was successful, set the metadata to indicate a successful transfer in response to a positive determination that the transfer of the data was successful, set the metadata to indicate initiation of a deletion of the data, determine whether the deletion of the data was successful, and set the metadata to indicate the successful deletion in response to a positive determination that the deletion of the data was successful.

12. The system of claim 11 wherein the data system is configured to transfer the data to the file system in response to the determination that the transfer of the data was unsuccessful.

13. The system of claim 11 wherein the data system is configured to delete the data in response to the determination that the deletion of the data was unsuccessful.

14. The system of claim 11 wherein the data system is configured to receive the data from an external source and ensure the integrity of the data.

15. The system of claim 11 wherein the metadata comprises a state flag that indicate a state of the data.

16. The system of claim 11 wherein the metadata comprises a state flag that indicate copies of the data.

17. The system of claim 16 wherein the management system is configured to process the metadata to determine where the copies of the data resides.

* * * * *

UNITED STATES PATENT AND TRADEMARK OFFICE
CERTIFICATE OF CORRECTION

PATENT NO. : 7,058,662 B2  Page 1 of 1
APPLICATION NO. : 09/728784
DATED : June 6, 2006
INVENTOR(S) : Kevin Wiggen and Barry Lind It is certified that error appears in the above-identified patent and that said Letters Patent is hereby corrected as shown below:

Title page items 12 and 75 –
Correct name of the first inventor is Kevin Wiggen.

Signed and Sealed this

Sixteenth Day of September, 2008

JON W. DUDAS
*Director of the United States Patent and Trademark Office*